United States Patent

Satoh et al.

Patent Number: 5,523,945
Date of Patent: Jun. 4, 1996

[54] RELATED INFORMATION PRESENTATION METHOD IN DOCUMENT PROCESSING SYSTEM

[75] Inventors: Kenji Satoh; Kazunori Muraki, both of Tokyo, Japan

[73] Assignee: NEC Corporation, Tokyo, Japan

[21] Appl. No.: 306,941

[22] Filed: Sep. 16, 1994

[30] Foreign Application Priority Data

Sep. 17, 1993 [JP] Japan .................................. 5-230700

[51] Int. Cl.$^6$ ............................. G06F 17/27; G06F 3/14; G06F 17/21; G06F 17/30
[52] U.S. Cl. ................................ 364/419.08; 364/419.1; 364/419.19; 395/600
[58] Field of Search ......................... 364/419.01, 419.08, 364/419.1, 419.11, 419.13, 419.17, 419.19; 395/600

[56] References Cited

U.S. PATENT DOCUMENTS

| | | | |
|---|---|---|---|
| 4,942,526 | 7/1990 | Okajima et al. | 364/419.08 |
| 5,109,509 | 4/1992 | Katayama et al. | 395/600 |
| 5,123,103 | 6/1992 | Ohtaki et al. | 395/600 |
| 5,128,865 | 7/1992 | Sadler | 364/419.02 |
| 5,181,163 | 1/1993 | Nakajima et al. | 364/419.08 |
| 5,200,893 | 4/1993 | Ozawa et al. | 364/419.1 |
| 5,257,186 | 10/1993 | Ukita et al. | 364/419.1 |
| 5,265,065 | 11/1993 | Turtle | 395/600 |
| 5,280,573 | 1/1994 | Kuga et al. | 395/145 |
| 5,297,042 | 3/1994 | Morita | 364/419.19 |
| 5,309,359 | 5/1994 | Katz et al. | 364/419.19 |
| 5,311,429 | 5/1994 | Tominaga | 364/419.01 |

FOREIGN PATENT DOCUMENTS 3-122760  5/1991  Japan ........................... G06F 15/20

Primary Examiner—Donald E. McElheny, Jr.
Assistant Examiner—Stephen R. Tkacs
Attorney, Agent, or Firm—Foley & Lardner

[57] ABSTRACT

The relationships between words included in an input character string are analyzed. At least one related element conforming to the analyzed relationships is extracted from the input character string. Subject sentences are retrieved from stored documents using the related elements as retrieval keys, and the retrieved subject sentences are displayed on screen. Priority rank is given to the respective subject sentences in accordance with the degrees of coincidence between the respective subject sentences and the related elements. The subject sentences are displayed on screen according to the given priority rank.

20 Claims, 5 Drawing Sheets

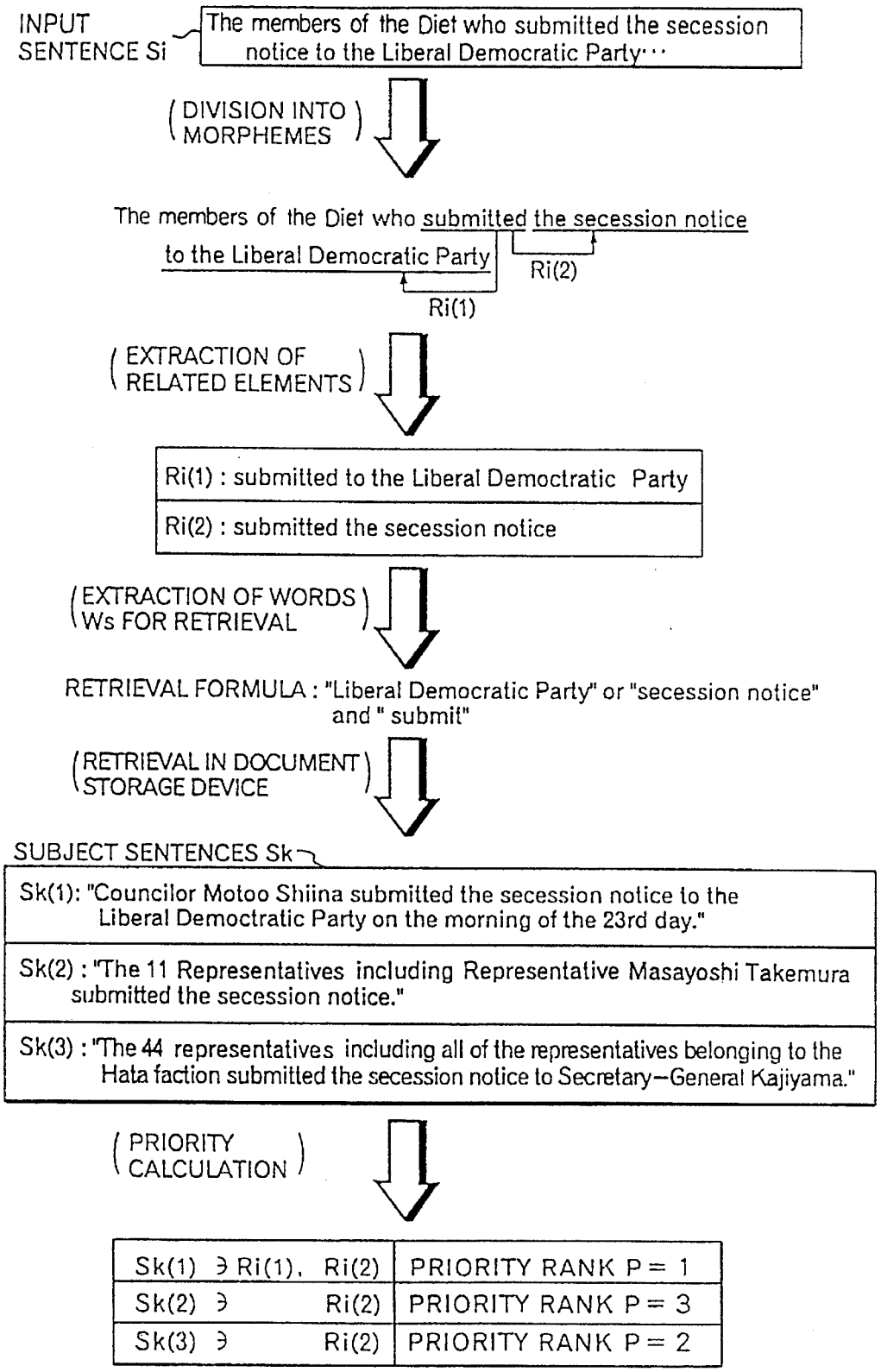

1

RELATED INFORMATION PRESENTATION METHOD IN DOCUMENT PROCESSING SYSTEM

BACKGROUND OF THE INVENTION

1. Field of the Invention

The present invention relates to a system for supporting document production and, more specifically, to a method and an apparatus for presenting information related to a document being produced to a user. 2. Description of the Prior Art Word processors, which enable the easy revising and brushup of sentences, are now widely used as a means for producing a document. Many types of word processors are also commercially available which additionally provide functions for facilitating document production, such as a synonym retrieval function and a document retrieval function. In particular, in the production of a document, such operations as confirming the correctness of information, augmenting the document through the addition of related information, and searching for a word or expression are very frequently performed. To this end, it is frequently required to refer to other documents.

An example of a document production apparatus that is intended to provide a variety of text expressions is disclosed in Japanese Unexamined Patent Publication No. 3-122760. This document production apparatus has an expression dictionary which stores expressions equivalent or similar to a certain expression. By specifying a form or style of a document in advance through the use of a setup menu, when a certain document is input, the expression dictionary is searched for expressions satisfying the specified condition, and expressions found are incorporated into the document being produced.

However, in the above conventional document production apparatus, since the operation of retrieving other documents is independent of the document production operation, the retrieval of documents can only be performed by suspending document production. Further, to specify a form or style of a text, a user must not only explicitly specify the type of expression but must also input an expression satisfying a retrieval condition. Therefore, the procedure of getting the necessary information is complicated and troublesome, and the desired information cannot be obtained unless a retrieval condition is set clearly.

SUMMARY OF THE INVENTION

An object of the present invention is to provide a related information presentation method which can present related information without suspending the document preparation operation of a user.

Another object of the invention is to provide a related information presentation method which can present related information to a user even when no explicit retrieval request is made.

A further object of the invention is to provide a related information presentation method which can present related information to a user in accordance with the degree of necessity.

A related information presentation method according to the present invention is characterized in that the relationships between words included in an input character string are analyzed, at least one related element consisting of two or more words which conform to the analyzed relationships is extracted from the input character string, and subject sentences are retrieved from stored documents using the related elements as retrieval keys and the retrieved subject sentences are presented to a user.

To retrieve the subject sentences, units that constitute the related elements are extracted from the related elements, then the subject sentences are retrieved from stored documents using the extracted units as retrieval keys, and priority ranks are given to the respective subject sentences in accordance with the degrees of coincidence between the respective subject sentences and the related elements. Then, the subject sentence having the highest priority rank is presented to the user.

It is desirable that the related element extracted from an input character string be semantic constituent units of the text. In the case of Japanese, a combination of two independent words and a word indicating a relationship between these words can be used as such semantic constituent units.

BRIEF DESCRIPTION OF THE DRAWINGS

FIG. 5 is a flowchart showing an operation process that is executed when certain sentences used as an example are input to the system of the embodiment.

DESCRIPTION OF THE PREFERRED EMBODIMENTS

An embodiment of the present invention will be hereinafter described in detail with reference to the accompanying drawings.

Figure 1:
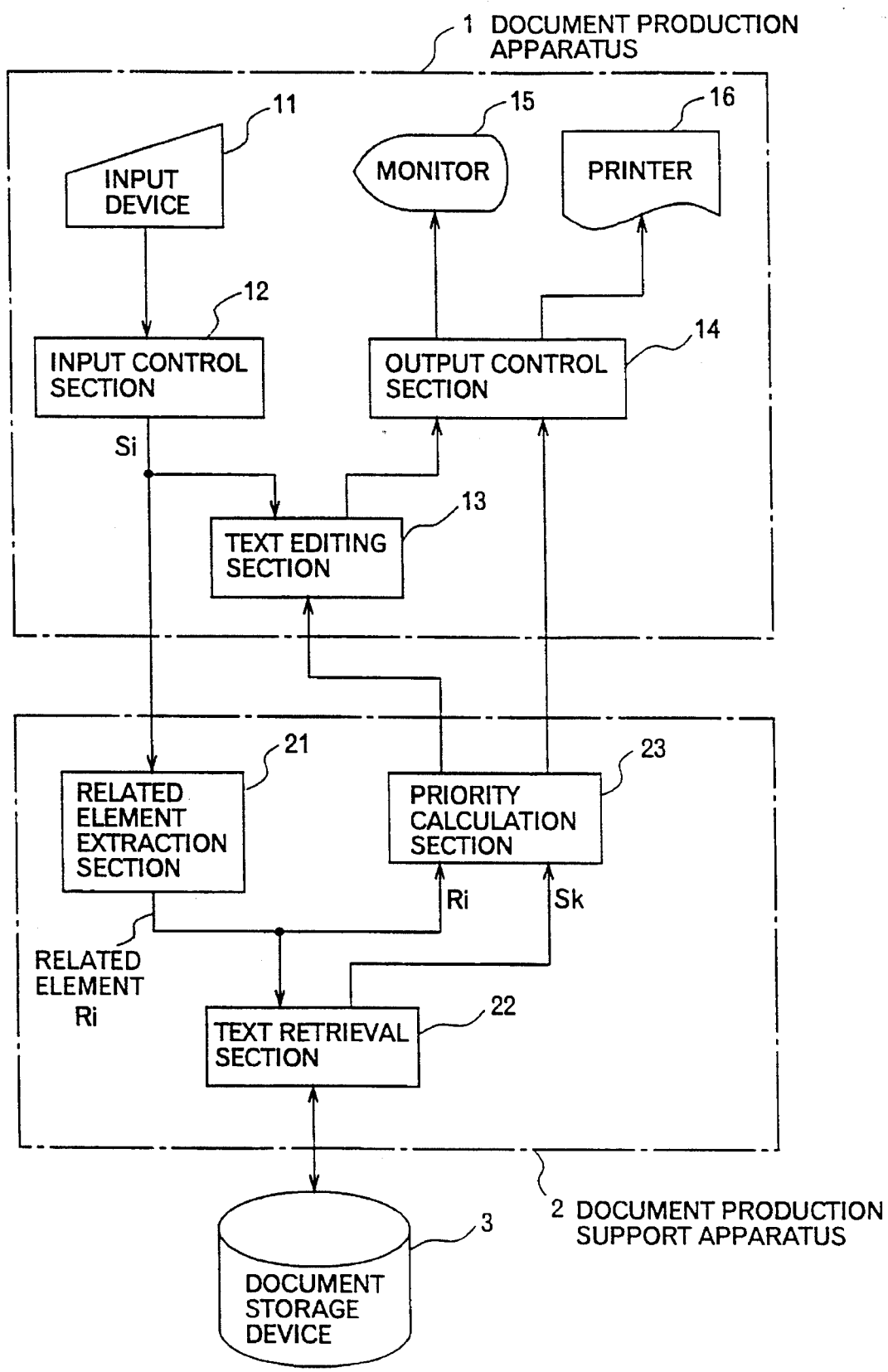
FIG. 1 is a block diagram showing a document processing system using an embodiment of a related information presentation according to the present invention.

Referring to FIG. 1, the document processing system is comprised of a document production apparatus 1, a document production support apparatus 2 according to this embodiment, and a document storage device 3.

The document production apparatus 1, which is a word processor, edits input character strings, and outputs the edited character strings in the form of a monitor display, printer output, etc. A user inputs the characters of an intended sentence or an edit instruction through an input device 11 such as a keyboard. A character string Si is fed, via an input control section 12, into a text editing section 13, which edits the character string in accordance with the edit instruction. The character string being edited is caused to be displayed on a monitor 15 through an output control section 14. The edited character string is printed by a printer 16 in accordance with a print instruction from the user.

A document production support apparatus 2 is comprised of a related element extraction section 21, a text retrieval section 22, and a priority calculation section 23. The support apparatus 2 searches the document storage device 3 for information related to the sentence being produced in the background of the document production operation, and presents information found to the user through the text editing section 13 and the output control section 14. Therefore, when the user simply inputs characters for document production, information related to an input sentence is automatically selected and displayed on the monitor 15.

The related element extraction section 21 receives the input character strings Si from the input control section 12, extracts the related element Ri from the input character string Si, and supplies the related element Ri to the text retrieval section 22 and the priority calculation section 23.

The text retrieval section 22 retrieves from the document storage device 3 using, as keyword, the related element Ri or words Ws that are components of the related element Ri, and supplies a subject sentence Sk that includes the keyword to the priority calculation section 23.

The priority calculation section 23 calculates a priority rank of the subject sentence Sk in accordance with the degree of its coincidence with the related element Ri, and supplies the priority rank thus calculated and the subject sentence Sk to the text editing section 13 or the output control section 14.

The text editing section 13 causes the monitor 15 to display, as a default, a subject sentence of the highest priority rank in the document being edited, and to sequentially display subject sentences of lower priority ranks in response to the user's selection operations. When the user does not want the subject sentences to be inserted in the document being edited, the output control section 14 causes the monitor 15 to display these subject sentences sequentially in the order of priority ranks.

The related element Ri is the type of keyword to be used for retrieving and presenting information related to the input character string Si, and preferably consists of semantic constituent units. For example, in the case of Japanese, a combination of two independent words and a case word (or a function word) indicating a relationship between these words can be such semantic constituent units. One sentence or a plurality of sentences can also be regarded as such semantic constituent units. To extract the related element Ri as explained above, the capability of morphological analysis is required in the related element extraction section 21. A further detailed description will be made below.

Extraction of related element Ri

Figure 2:
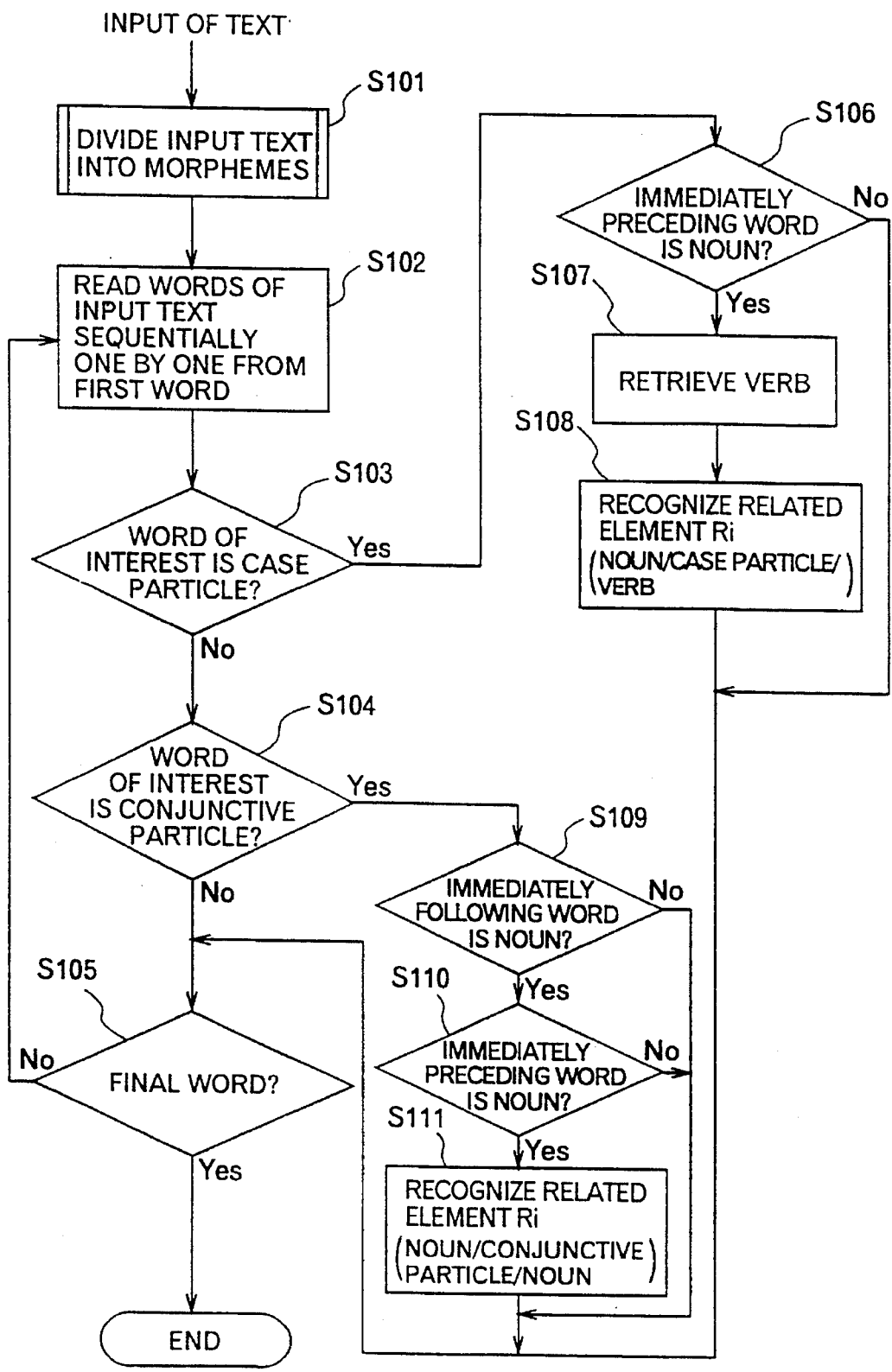
FIG. 2 is a flowchart showing an example of a related element extraction procedure of a related element extraction section in the embodiment.

FIG. 2 is a flowchart showing a related element extraction procedure in the case of Japanese. After dividing a character string Si input by a user into morphemes (S101), the related element extraction section 21 looks at the words of the input character string Si sequentially one by one, starting from the first word (S102) to the final word (S105), deciding on whether the word of interest is a case particle (S103) and whether it is a conjunctive particle (S104).

If the word of interest is a case particle (the decision in step S103 is YES), it is decided whether the immediately preceding word is a noun (S106). If the decision is affirmative, the related element extraction section 21 retrieves the verb that appears first in the character string Si (S107), and recognizes a combination of the case particle of the word of interest, the immediately preceding noun, and the following verb (noun-case particle-verb) as a related element Ri (S108). If the word immediately preceding the case particle is not a noun (the decision in S106 is NO), a related element Ri is not extracted.

If the word of interest is a conjunctive particle (the decision in S104 is YES), it is decided whether a noun exists immediately before and after the word of interest (S109 and S110). If such a noun exists immediately before and after the word of interest, a combination of the immediately preceding noun, the conjunctive particle, and the immediately following noun (noun-particle-noun) is recognized as a related element Ri (S111). If no noun exists immediately before or after the conjunctive particle, a related element Ri is not extracted.

Such a series of processes is repeatedly executed until the final word of the input character string Si is found (S105), so that a related element Ri is extracted from a character string. Therefore, there are cases where a plurality of related elements Ri(1), Ri(2), . . . may be extracted from a certain input character string Si.

Text retrieval

Figure 3:
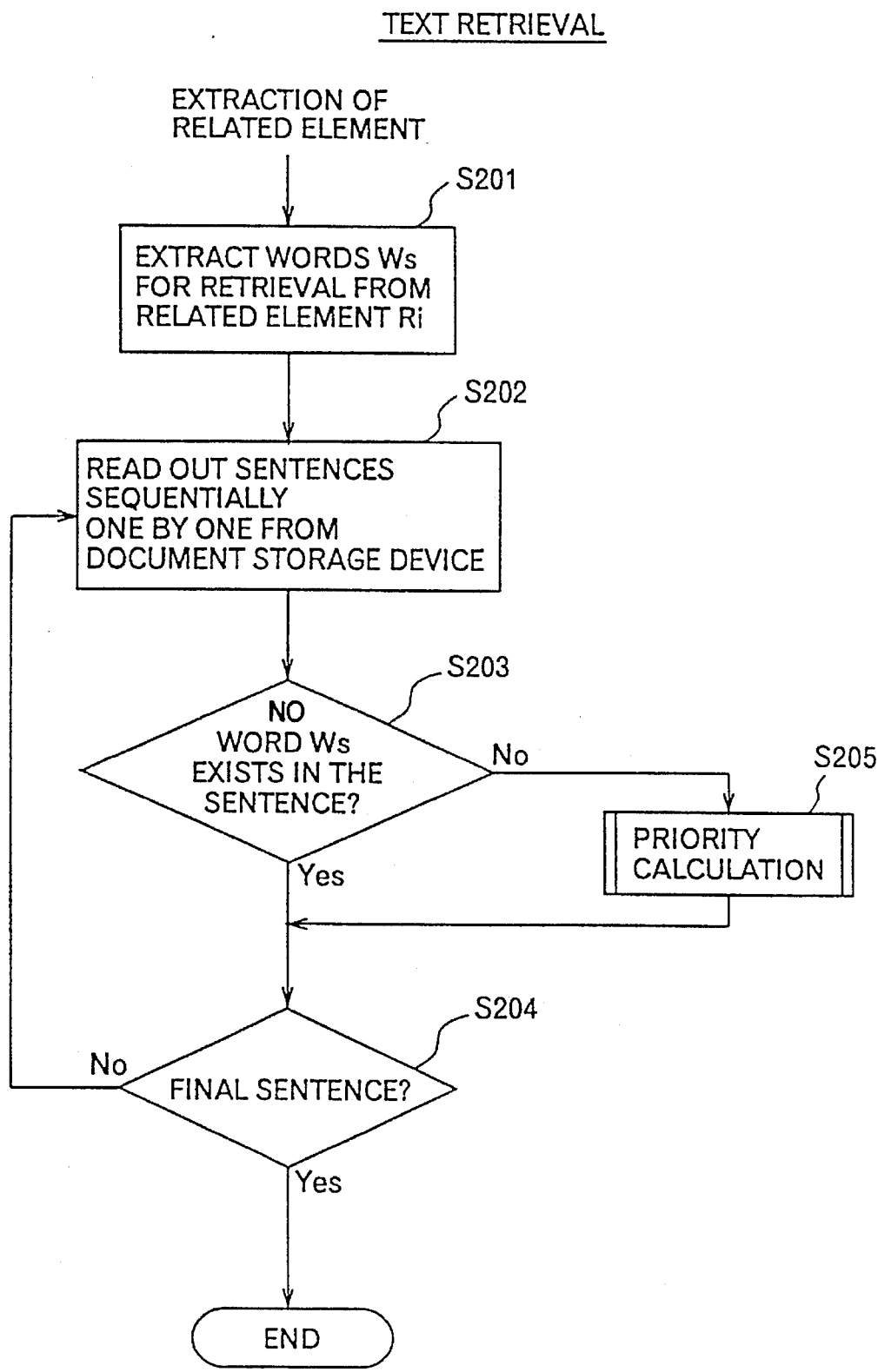
FIG. 3 is a flowchart showing an example of a retrieval procedure of a text retrieval section in the embodiment.

FIG. 3 is a flowchart showing an example of a retrieval procedure of the text retrieval section 22 in this embodiment. When receiving the related element Ri from the related element extraction section 21, the text retrieval section 22 extracts at least a keyword Ws for retrieval (S201). It is sufficient that the keyword Ws be a component of the related element Ri. In the example under consideration, a keyword Ws is a word (noun or verb). As described above, the related element Ri itself can be used as the keyword Ws.

Then, the text retrieval section 22 reads out, from the document storage device 3, individual sentences sequentially one by one (S202), and repeats to the final sentence (S204) a decision on whether the keyword Ws exists in a readout sentence (S203). If the keyword Ws exists in the readout sentence (the decision in S203 is NO), a priority calculation is made on that sentence (referred to as a subject sentence Sk) by the priority calculation section 23 (S205).

Since the unit of reading from the document storage device 3 depends on the related element Ri, it may be a word, a sentence, a paragraph, or one document. In some cases, it may extend to a group of a plurality of documents.

Priority calculation

Figure 4:
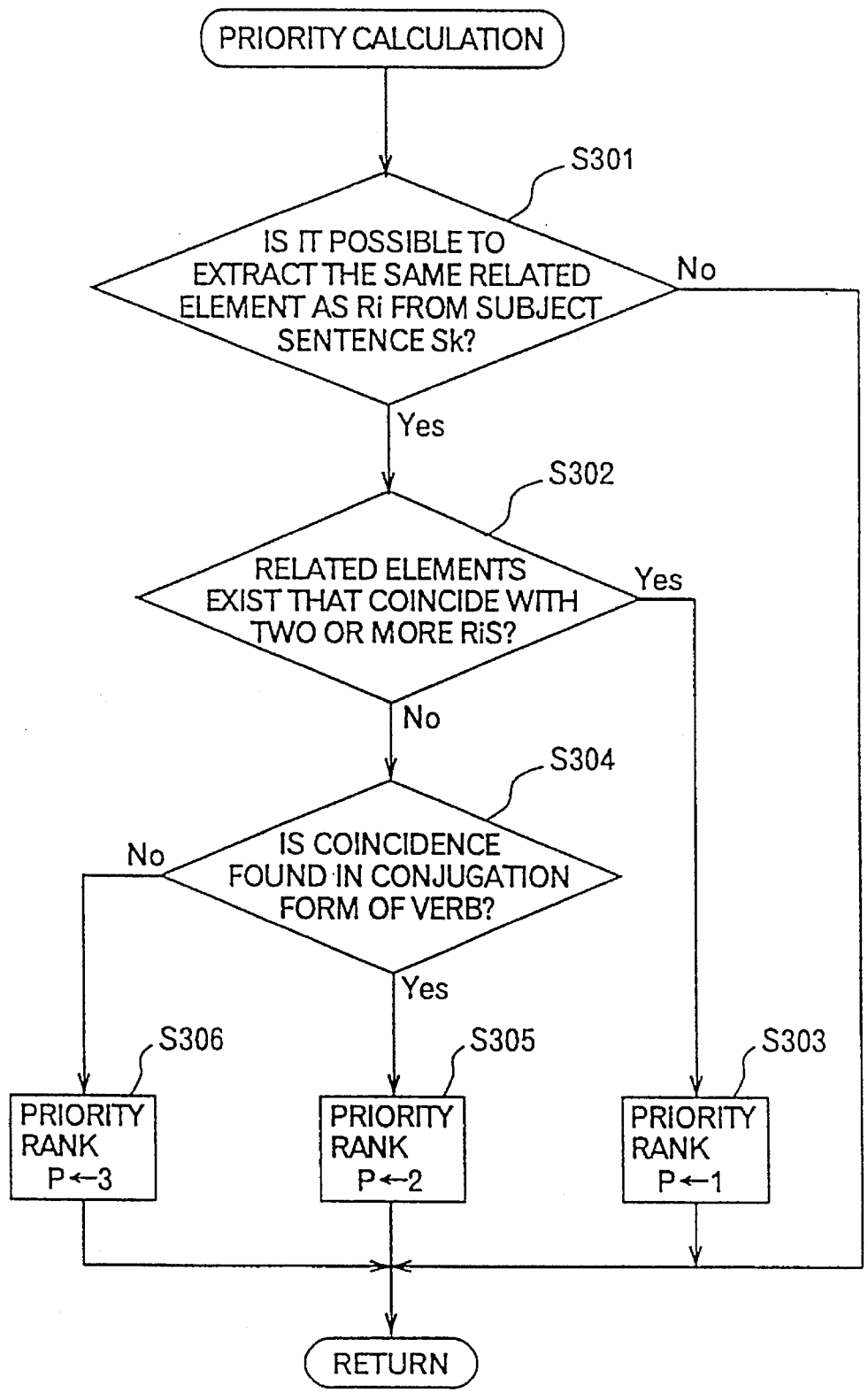
FIG. 4 is a flowchart showing an example of an operating procedure of a priority calculation section in the embodiment.

FIG. 4 is a flowchart showing an example of an operating procedure of the priority calculation section 23 in this embodiment.

First, it is examined whether it is possible to extract the same related element as the related element Ri that has been obtained by the related element extraction section 21 from the subject sentence Sk that has been obtained by the retrieval (S301). As in the case of the related element extraction process of FIG. 2, using two individual words and a case word indicating a relationship between them extracted from the subject sentence Sk, a decision may be made whether the same related element as the related element Ri is obtained. If it is not possible to extract it (the decision in S301 is NO), the process returns to the text retrieval routine.

If it is possible to extract the same related element (the decision in S301 is YES), it is examined whether the related elements as extracted from the subject sentence Sk coincide with two or more related elements Ri (S302). If the decision is affirmative, the highest priority rank P=1 is given to the subject sentence Sk concerned (S303). It is apparent that the priority ranks may be set more finely with the number of coincidences of the related elements.

If coincidences of a plurality of related elements are not found, in other words, if a coincidence with only one related element is found (the decision in S302 is NO), it is examined whether a coincidence in the conjugation of an independent word (in other words, a conjugation form of a verb) is found between the related elements (S304). If a coincidence is found (the decision in S304 is YES), a priority rank P=2 is given (S305). If a coincidence is not found, the lowest priority rank P=3 is given (S306).

As described above, the degree of coincidence is regarded as the degree of importance of the information. Therefore, the priority rank is determined by checking coincidence in surface expressions of the relationship between independent words and the conjugation of an independent word.

Specific example of operation

The operation of the document processing system shown in FIG. 1 will be described in further detail using specific sentences.

FIG. 5 is a flowchart showing an operation process that is executed when certain sentences are input as an example to the system of the embodiment. First, it is assumed that a user has input, through the input device 11, an input character string Si: "The members of the Diet who submitted the secession notice to the Liberal Democratic Party . . . ". Receiving this input character string Si, the text editing section 13 edits the document being produced. At the same time, the related element extraction section 21 divides the input character string Si into morphemes, and then extracts semantic constituent units, i.e., related elements Ri(1): "submitted to the Liberal Democratic Party" and Ri(2): "submitted the secession notice".

The text retrieval section 22 extracts keyword Ws for retrieving "Liberal Democratic Party", "secession notice" and "submit" from the related elements Ri(1) and Ri(2), and retrieves subject sentences from the document storage device 3 using these keyword Ws. It is assumed that the retrieval has found and output three subject sentences: Sk(1) "Councilor Motoo Shiina submitted the secession notice to the Liberal Democratic Party on the morning of the 23rd day"; Sk(2) "The eleven Representatives including Representative Masayoshi Takemura submitted the secession notice"; and Sk(3) "The 44 Representatives including all of the representatives belonging to the Hata faction submitted the secession notice to Secretary-General Kajiyama". These subject sentences may exist in either one document or a plurality of documents stored in the document storage device 3.

The priority calculation section 23 extracts the related elements "submit to the Liberal Democratic Party" and "submitted the secession notice" from the subject sentence Sk(1), and the related elements "submit the secession notice" from each of the subject sentence Sk(2) and Sk(3). Then, the priority calculation section 23 examines, sentence by sentence, the degree of coincidence between the respective related elements of the subject sentence and the related elements Ri(1) and Ri(2) of the input character string Si. Since the related elements of the subject sentence Sk(1) coincide with both related elements Ri(1) and Ri(2), the priority rank P=1 is given to the subject sentence Sk(1). While the related element of each of the subject sentences Sk(2) and Sk(3) coincides with only the related element Ri(2), in the case of the subject sentence Sk(3) the coincidence with the related element Ri(2) is to the extent of the conjugate of the verb ("submitted"). Therefore, the priority rank P=2 is given to the subject sentence Sk(3), and the priority rank P=3 is given to the subject sentence Sk(2).

The subject sentences Sk(1)–Sk(3) given the respective priority ranks are supplied to the text editing section 13 or the output control section 14 in accordance with the user's instruction. The text editing section 13 automatically inserts the subject sentence Sk(1) having the highest priority rank among the input subject sentences at the cursor position of the document being edited. On the one hand, it is possible to replace the subject sentence Sk(1) with the lower priority rank sentence Sk(3) or Sk(2) in accordance with the user's selection. Further, it is easy to delete the inserted subject sentence by continuously inputting characters. On the other hand, where the user has designated only display of the subject sentences, the subject sentences Sk(1)–Sk(3) are supplied to the output control section 14, and displayed on the monitor 15 separately from the document being edited.

It is assumed that, for example, the user knows the seceding from the party of only "people including Mr. Takemura" and "people belonging to the Hata faction," and has input a sentence Si related to the seceding from the party of these people. In this case, as a result of the above-described processing, the highest priority rank subject sentence Sk(1) is displayed on the monitor 15, so that the user can obtain the related information that Councilor Motoo Shiina has also seceded from the party. Therefore, the user can produce a document including this related information.

As described above in detail, in the related information presentation method according to the invention, the relationships between words included in an input character string are analyzed, related elements each consisting of two or more words which conform to those relationships are extracted from the input character string, and subject sentences are retrieved from stored documents using the related elements as retrieval keys and presented to a user.

As a result, when characters are simply input, the related information is automatically displayed without suspending the document production operation. Since the retrieval is performed using the related elements, the related information can even be presented to a user who does not make an explicit retrieval request. Further, by determining the priority rank based on the degree of coincidence between the retrieved subject sentences and the related elements, the related information can be presented to the user in accordance with necessity.

What is claimed is:

1. A method for presenting related information in a document processing system which includes an input device, a display device, a processor and a document storage, the method comprising the steps of:

a) inputting a word string through the input device;

b) extracting a related element from the word string, the related element comprising two words and a relational word which indicates a relation between the two words;

c) retrieving a related word string from the document storage, the related word string including the related element; and d) presenting the related word string to a user through the display device.

2. The method according to claim 1, wherein the related element comprises a semantic constituent unit of the word string.

3. The method according to claim 1, wherein step (c) comprises the steps of:

extracting a plurality of words from the related element; and retrieving the related word string from the document storage using the words.

4. The method according to claim 1, wherein the related element is used in the step of retrieving the related word string from the document storage.

5. The method according to claim 1, further comprising the steps of:

e) giving a priority rank to the related word string in accordance with a degree of coincidence between the related word string and the related element; and f) presenting the related word string to the user according to the priority rank.

6. A method for presenting related information in a document processing system which includes an input device, a display device and a document storage, the method comprising the steps of:

a) inputting a word string through the input device;

b) extracting a plurality of related elements from the word string, each related element comprising two words and a relational word which indicates a relation between the two words;

c) retrieving a plurality of subject sentences from the document storage, each subject sentence including at least one of the related elements; and d) presenting the subject sentences to a user through the display device.

7. The method according to claim 6, wherein the related elements include a related element comprising a semantic constituent unit of the word string.

8. The method according to claim 6, wherein step (c) comprises the steps of:

extracting a plurality of words from said each related element; and retrieving the subject sentences from the document storage using the words.

9. The method according to claim 6, wherein the related elements are used in the step of retrieving the subject sentences from the document storage.

10. The method according to claim 6, further comprising the steps of:

(e) giving a priority rank to said each sentence in accordance with a degree of coincidence between said each subject sentence and the related elements; and (f) presenting said each subject sentence to the user according to the priority rank.

11. The method according to claim 10, wherein the degree of coincidence is represented by the number of the related elements included in said each subject sentence.

12. A method for presenting related information in a document processing system which includes an input device, a display device and a document storage, the method comprising the steps of:

a) inputting a word string through the input device;

b) extracting a plurality of related elements from the word string, each related element comprising two words and a relational word which indicates a relationship between the two words;

c) retrieving a plurality of subject sentences from the document storage, each subject sentence including at least one of the related elements;

d) giving a priority rank to said each subject sentence in accordance with a degree of coincidence between said each subject sentence and the related elements; and e) presenting said each subject sentence to a user according to the priority rank through the display device.

13. The method according to claim 12, wherein said each related element comprises a semantic constituent unit of the word string.

14. The method according to claim 12, wherein step (c) comprises the steps of:

extracting a plurality of words from said each related element; and retrieving the subject sentences from the document storage using the words.

15. The method according to claim 12, wherein the related elements are used in the step of retrieving the subject sentences from the document storage.

16. The method according to claim 12, wherein the degree of coincidence is represented by the number of the related elements included in said each subject sentence.

17. The method according to claim 12, wherein the step (d) comprises the step of giving a priority rank to said each subject sentence in accordance with the number of the related elements included in said each subject sentences and in accordance with whether said each subject sentence has a different conjugation form of a verb contained in the related elements.

18. A system for presenting related information having an input device, a display device, a processor and a document storage, the system comprising:

input means for inputting a word string through the input device;

extracting means for extracting a related element from the word string, the related element comprising two words and a relational word which indicates a relation between the two words;

retrieving means for retrieving a subject sentence from the document storage, the subject sentence including the related element; and display control means for presenting the subject sentence to a user through the display device.

19. A system for presenting related information having an input device, a display device and a document storage, the system comprising:

input means for inputting a word string through the input device;

extracting means for extracting a plurality of related elements from the word string, each related element comprising two words and a relational word which indicates a relation between the two words;

retrieving means for retrieving a plurality of subject sentences from the document storage, each subject sentence including at least one of the related elements; and display control means for presenting the subject sentences to a user through the display device.

20. A system for presenting related information having an input device, a display device and a document storage, the system comprising:

input means for inputting a word string through the input device;

extracting means for extracting a plurality of related elements from the word string, each related element comprising two words and a relational word which indicates a relationship between the two words;

retrieving means for retrieving a plurality of subject sentences from the document storage, each subject sentence including at least one of the related elements;

priority calculation means for giving a priority rank to said each subject sentence in accordance with a degree of coincidence between the subject sentence and the related elements; and display control means for presenting said each subject sentence to a user through the display device according to the priority rank.

* * * * *